No. 782,820.

Patented February 21, 1905.

UNITED STATES PATENT OFFICE.

JACOB E. BLOOM, OF NEW YORK, N. Y.

FATTY EDIBLE PREPARATION.

SPECIFICATION forming part of Letters Patent No. 782,820, dated February 21, 1905.

Application filed January 15, 1903. Serial No. 139,200.

*To all whom it may concern:*

Be it known that I, JACOB E. BLOOM, a citizen of the United States, and a resident of the borough of Manhattan, in the city, county, and State of New York, temporarily residing at New Orleans, parish of Orleans, Louisiana, have invented a certain new and useful Fatty Edible Preparation, of which the following is a specification.

My improvement has for its primary object the changing of the fats or oils to be eaten by man to a compound nearly approximating that of human fat as regards its contents of olein, palmitin, and stearin, and incidentally so that the fats will always remain liquid at the body temperature of 100° Fahrenheit when eaten.

The edible and culinary fats as obtained from natural sources, whether from the animal or vegetable kingdom, are not homogeneous chemical compounds, but consist of certain mixtures of proximate constituents, principally olein, palmitin, and stearin, in varying proportions not at all approximating the proportions of olein, palmitin, and stearin as found in human fat. The human fat of an adult upon analysis was found to contain about eighty-seven per cent. olein and eight per cent. palmitin and two per cent. stearin, and that of a child contains sixty-five per cent. olein and twenty-eight per cent. palmitin and three per cent. stearin, the remainder comprising minute quantities of caproic, myristic, and other undetermined insoluble fatty acids. The said percentages vary in fats from various parts of the body and different ages. The melting-point of human fat is about 63½° to 77° Fahrenheit. To readily pass from the stomach to the duodenum or small intestine (in which and not in the stomach fats or oils are digested) and to be easily digested there, fats or oils should melt at or preferably far below the normal heat of the human stomach—to wit, about 100° Fahrenheit; but this is much lower than the melting-point of beef, mutton, and other flesh fats.

The closer any fat eaten by man resembles human fat as regards its aforesaid percentages of olein, palmitin, and stearin the more easily does it become liquid in the stomach and pass into the duodenum and small intestine and the more readily it is digested and assimilated. The olein readily dissolves a certain portion of stearin and palmitin at body temperature; but any excess of stearin and palmitin over such soluble portions is objectionable and injurious on account of difficulty of digestion and from passing from the stomach into the duodenum, and any such excess over the aforesaid proportions as found in human fat is objectionable, as such excess cannot be assimilated. Such excess is present in large amounts in the crude animal fats, beef and mutton suet, and other fats and oils as now marketed. My improvement removes this excess and provides a superior edible and culinary fat or oil easily digested and totally assimilated.

My improvement has reference chiefly to the olein, palmitin, and stearin contents of edible culinary fats and which together comprise nearly the whole of such fats, as also of human fats.

In my invention of fatty edible preparation, which I call a "destearinized" fat or "humanized" fat, I compound or manufacture same so as to have a predetermined content and to approximate the relative proportions of olein, palmitin, and stearin aforesaid. The exact proportions of the ingredients may be varied within certain limits to best accord with the requirements of different users. Thus the formula preferred for adults comprises eighty-seven per cent. or parts of olein, eight per cent. or parts of palmitin, and two per cent. or parts of stearin, while for a child the formula is changed to sixty-five per cent. or parts of olein, twenty-eight per cent. or parts of palmitin, and three per cent. or parts of stearin. I also find it desirable in some instances to employ a formula comprising seventy-five per cent. olein and twenty-five per cent. palmitin and stearin, the latter two preferably in the ratio of four parts of palmitin to one part of stearin, as in the adult-fat formula aforesaid. These formulas approximate the proportions of olein, palmitin, and stearin as found in human fat. I attain this result by manufacturing my fat of either of the above formulas by any of the methods now well known to scientists skilled in the art of rendering and manufacturing fats and oils.

The preferred method of manufacturing my improved fat from crude animal fats, such as beef-suet, consists in rendering, clarifying, and refining such by any of the present well-known methods, preferably by dry fusion, then permit the rendered fat to settle and remain quiescent for several days, preferably three days, at a low temperature, preferably 60° Fahrenheit, when a large portion of the stearin and palmitin or solid fats will solidify, then by pressure in cloths press or strain out the liquid fat, which latter consists principally of olein with some stearin and palmitin in solution. This latter liquid fat I again subject to the said operation of settling and of straining by pressure in cloths. This second strained liquid fat I analyze to ascertain percentages of olein, palmitin, and stearin, and I then add thereto such portions of olein or of melted stearin or of fused palmitin or of a combination thereof as may be required to constitute the formula aforesaid. The wide range in the melting or congealing points of temperature of olein, stearin, and palmitin affords a ready method by congealing and quiescence and by pressure of removing excess of stearin or palmitin from natural fat or oil.

Though I prefer to manufacture my improved fats from animal fats only, yet I do not restrict myself thereto. I can mix with the rendered animal fats vegetable fats abounding in olein and deficient in solid fats, such as the refined olive-oil or cotton-seed oils or cocoanut-oil or peanut-oil or other nut-oil, or I can add to my animal fats olein or palmitin or stearin from any vegetable or other suitable source to the end that my improved fat shall contain olein, palmitin, and stearin in the proportions aforesaid without removing or excluding other minor fats or ingredients or fatty acids as may be present in the native or natural fats. Though I prefer to compound or manufacture my fat so as to be composed solely of olein, palmitin, and stearin in the proportions aforesaid, yet I also manufacture same so as to comprise said proportions or parts and in addition any other minor healthful fats or fatty acids as found in the native fats. In other words, it is not essential to remove from the native fat other fatty acids than the excess of olein, palmitin, or stearin to constitute said formula.

For ordinary consumption I do not make my improved fat exactly of the same percentages of olein, palmitin, and stearin as found in human fat, not alone for the reason that the latter varies for different ages and different parts of the body, but also because ordinary fats are eaten with other aliments containing small percentages of invisible fats, and when my improved fat is eaten or cooked with such other aliments containing invisible fats the solid portions of the latter are dissolved in the olein of my improved fats, and thus the passage of said solid portions from the stomach to duodenum is facilitated, and though it may give a percentage of stearin or palmitin in excess of that which will be assimilated, nevertheless the aforesaid advantage of ease of digestion will be a new and useful one in such cases also. For such ordinary consumption I prefer the above-named adult-fat formula; but where the fat or oil is to be consumed alone or with foods or aliments which do not contain other or invisible fats then I prefer the above-stated formula for child or adult, respectively.

Human fat contains a very small amount of triglycerid of myristic acid or trimyristine. This ingredient is also found in many oils—for example, cocoanut-oil, palm-nut oil, and dika-nut—for which reason a very small amount of either of said oils may be added to the fat. It is preferred, however, to use nutmeg-butter or mace-butter, which contains about forty-five per cent. of trimyristine, for the reason that it does not readily become rancid and for the further reason that it gives a flavor to the fat which is very desirable—for instance, where an emulsion of the liquid fat only is prescribed. About one-half per cent. of this butter is used.

Besides containing the neutral fats—to wit, olein, stearin, and palmitin—i. e., the triglycerid of oleic acid and of stearic acid and of palmitic acid—human fat also contains some free acids—i. e., oleic acid, &c. In my fats I also preferably have some free fatty acids, which in addition to filling this want of human fat also perform the function of aiding the emulsion and digestion of all the fats in the small intestine even though there be a deficiency of bile and pancreatic juice. By properly changing the proportions of the other ingredients five or six per cent. of free oleic acid may be added to the fat, or the destearinized fat may by artificial decomposition or otherwise be changed to include five or six per cent. of said acid. The percentage named of said acid is not, however, essential.

Where my improved fat would be liquid at ordinary temperature and when such liquid or oily state would prove unpalatable to some persons, I jellify or partially solidify the liquid fat by some of the well-known methods—as, for instance, by the use of an edible grade of gelatin—avoiding, however, those methods using stearin.

When the liquid fat or oil is to be packed by itself for use from time to time from the original package, any suitable harmless preservative, such as slippery-elm bark, should be cooked with the fat while the latter is being rendered.

I am aware that there are fats and oils made from beef-suet and other fats by extracting from the latter indefinite portions of the solid fats—to wit, stearin and palmitin—the remainder consisting of a so-called "oleo-oil" and which is compounded with other fats to make oleomargarin; but these contain from thirty per cent. to fifty-four per cent. olein, the balance being stearin and palmitin, with the proportion of stearin to palmitin constantly varying, no two manufactures being alike, and I am not aware that such products as also lard, lard-oil, cotton-seed oil, and other commercial edible or culinary oils and fats contain the proportions or percentages above stated of olein, palmitin, and stearin as found in human fats, the primary object of the invention of my improved fat, never heretofore produced. I am aware that the separate parts—to wit, olein, palmitin, and stearin—have been heretofore known, as also compounds thereof; but compounds of the proportions or percentages thereof as aforesaid have not been known heretofore in the connection and arrangement aforesaid and with the injurious excess of stearin and palmitin removed.

Having thus described the invention, what I believe to be new, and desire to secure by Letters Patent, is—

1. As a new article of manufacture, a food product containing olein, palmitin and stearin in approximately the proportions in which the said ingredients occur in human fat.

2. As a new article of manufacture, an artificially-prepared edible fat of a predetermined formula comprising olein, palmitin and stearin in approximately the proportions in which the said proximate principles exist in human fat.

3. As a new article of manufacture, an artificially-prepared edible fat of predetermined formula analogizing human fat and comprising approximately not less than sixty-five per cent. olein and approximately not more than three per cent. stearin, the remainder of said fat comprising palmitin.

4. As a new article of manufacture, a destearinized artificially-prepared fat for edible and culinary purposes having a predetermined content of olein, palmitin and stearin, the proportions of olein comprising approximately eighty-seven per cent., the remainder comprising palmitin and stearin in the approximate ratio of four parts palmitin to one of stearin.

5. As a new article of manufacture, an edible fat comprising olein, palmitin, stearin and free oleic acid in approximately the proportions in which the said ingredients occur in human fat.

6. As a new article of manufacture, a fat for edible purposes comprising olein, palmitin, stearin and trimyristine in about the proportions in which the said ingredients occur in human fat.

7. As a new article of manufacture, a fat having a predetermined content of olein, palmitin and stearin produced by eliminating from natural, animal or vegetable fat the excess of stearin and palmitin over that occurring in human fat, the said first-mentioned fat comprising among other natural-fat ingredients, olein, palmitin and stearin in substantially the proportions in which the said proximate principles occur in human fat.

8. As a new article of manufacture, an artificially-prepared edible fat melting at below 100° Fahrenheit and having a predetermined content of olein, palmitin and stearin and wherein the percentage of olein in animal or vegetable fats is increased to the requisite extent to produce the proportions of the said ingredients substantially as occurring in human fat.

9. As a new article of manufacture, a fat having a non-cellular structure and comprising olein, palmitin and stearin in approximately the proportions in which the said ingredients are found in human fat.

10. As a new article of manufacture, a fatty composition free from fatty tissue and comprising olein, palmitin, and stearin in approximately the proportions in which the said ingredients are found in human fat.

11. As a new article of manufacture, an edible fat comprising olein, palmitin and stearin in about the proportions in which the said ingredients occur in human fat and nutmeg-butter.

12. As a new article of manufacture, an edible fat comprising olein, palmitin and stearin, trimyristine and free oleic acid in about the proportions stated to analogize human fat.

13. As a new article of manufacture for edible purposes, a fat comprising olein, palmitin and stearin in about the proportions in which the said ingredients occur in human fat and a jellifying ingredient.

14. As a new article of manufacture, a fat comprising olein, palmitin, stearin, trimyristine, free oleic acid and a jellifying ingredient in approximately the proportions stated.

JACOB E. BLOOM.

Witnesses:
JOSEPH G. PARKINSON,
ALBERT H. HETTICH.